(12) United States Patent
Ko et al.

(10) Patent No.: US 7,929,771 B2
(45) Date of Patent: Apr. 19, 2011

(54) APPARATUS AND METHOD FOR DETECTING A FACE

(75) Inventors: Byoung-Chul Ko, Seoul (KR); Kwang-Choon Kim, Suwon-si (KR); Seung-Hyun Baek, Seoul (KR)

(73) Assignee: Samsung Electronics Co., Ltd (KR)

( * ) Notice: Subject to any disclaimer, the term of this patent is extended or adjusted under 35 U.S.C. 154(b) by 1295 days.

(21) Appl. No.: 11/497,752

(22) Filed: Aug. 2, 2006

(65) Prior Publication Data

US 2007/0031041 A1    Feb. 8, 2007

(30) Foreign Application Priority Data

Aug. 2, 2005  (KR) .................. 10-2005-0070751

(51) Int. Cl.
*G06K 9/46* (2006.01)
(52) U.S. Cl. ........ 382/190; 382/118; 382/253; 382/176; 382/225; 382/232; 382/156; 345/427; 345/419; 345/424
(58) Field of Classification Search .............. 382/190, 382/118, 128, 159, 165, 170, 253, 276, 225, 382/232, 156; 345/427, 419, 424
See application file for complete search history.

(56) References Cited

U.S. PATENT DOCUMENTS

| 2003/0044078 A1* | 3/2003 | Joshi et al. ............... 382/243 |
| 2004/0205482 A1* | 10/2004 | Basu et al. ............. 715/500.1 |
| 2005/0058369 A1* | 3/2005 | Sanse et al. ............... 382/282 |
| 2005/0190953 A1* | 9/2005 | Nagahashi et al. ........ 382/118 |

FOREIGN PATENT DOCUMENTS

KR  1020020019629  3/2002

* cited by examiner

*Primary Examiner* — Mike Rahmjoo

(74) *Attorney, Agent, or Firm* — The Farrell Law Firm, P.C.

(57) ABSTRACT

Disclosed is an apparatus and method for detecting a face from an image. The apparatus and method uses color components and enables a Support Vector Machine (SVM) having superior recognition performance to previously learn face and non-face images and determine whether an image is a face image based on a learned image database by reducing the size of a feature vector of a face as compared to conventional systems. Accordingly, the apparatus converts a face image into a mosaic image having a minimum size to reduce the dimension of the feature vector, in order to rapidly and correctly detect a face image.

16 Claims, 7 Drawing Sheets

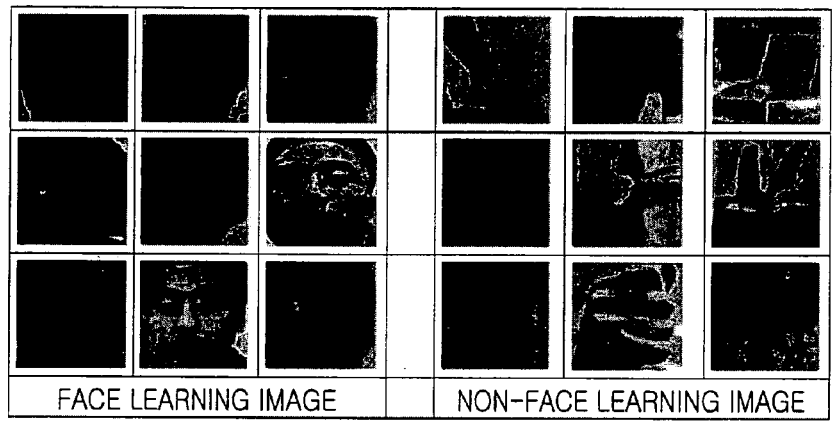
FIG.4A  FIG.4B
 
FIG.5A  FIG.5B

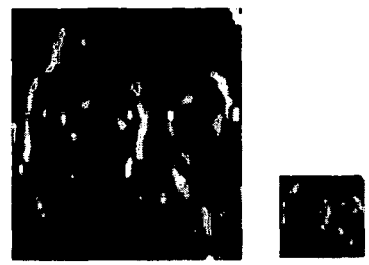
FIG.6A    FIG.6B
FIG.7A    FIG.7B

APPARATUS AND METHOD FOR DETECTING A FACE

PRIORITY

This application claims priority under 35 U.S.C. §119 of an application entitled "Apparatus And Method for Detecting Face" filed in the Korean Intellectual Property Office on Aug. 2, 2005 and assigned Ser. No. 2005-70751, the contents of which are incorporated herein by reference.

BACKGROUND OF THE INVENTION

1. Field of the Invention

The present invention relates to an apparatus and method for detecting a face.

2. Description of the Related Art

Devices such as embedded robots, mobile telephones and (PDAs), which have low-capacity memories and low-level processors, require algorithms to efficiently and precisely detect a face in a digital image.

Faces have various sizes, positions and angles in images and illumination radiated onto the faces may vary, so it is difficult to precisely detect a face in a digital image. For example, by changing a camera's angle face detection is hindered by a consequent change in a face's angle caused by a change in a camera angle. Moreover, a change in a face's pose (e.g., a frontal face, a 45-degree rotated face and a side view of a face), a hidden face, change in facial expression, change in lighting, etc., can also hinder a face's detection.

A feature-based face detection scheme is typically used for detecting unchangeable features such as the eyes, nose mouth of a face as well as the face's complexion. Particularly, since the complexion is less susceptible to a face's movement, rotation and change in size, schemes of detecting a face by using the complexion are widely employed.

In addition, according to a template-based face detection scheme, several patterns for faces are constructed and stored to be used at a later time to detect faces. After this, the patterns are compared with an image in an image search window on a one-by-one basis, thereby detecting a face.

Recently, a support-vector-machine-based (SVM-based) face detection scheme has been widely used. According to the SVM-based face detection scheme, different regions are sub-sampled from an image, a face and a non-face (i.e., a portion which is not included in a face) are learned through a learning device, and then a face is detected from an input image.

However, the feature-based face detection scheme is inefficient, because of color and contrast changes when the spectrum of light is significantly changed.

Also, the template-based face detection scheme has an advantage in that required calculations are simple, but has a disadvantage in that it is susceptible to errors and miscalculation caused by a face's rotation and size being changed, changes in lighting, and changes in image noise. In addition, according to the template-based face detection scheme, in order to detect faces of various sizes, it is necessary to gradually reduce the size of an input image step-by-step to match the sizes of templates, thereby requiring a very long processing period.

Although the SVM-based face detection scheme provides a satisfactory detection rate, as the number of learned databases and the dimension of a support vector resulting from learning increases, the necessary number of stored databases increases, along with matching time, so this scheme is not suitable for real-time processing. In addition, for example, when a face image having a size of "32×32" is used for learning, this is converted into a vector of 1024 dimensions. In this case, when 100 support vectors are extracted, comparison operations of 1024×1024×100 times are required for one image having the same size of "32×32" newly-input for matching. Therefore, the SVM-based face detection scheme is inefficient in view of time when an image has a large size and many face candidate regions exist in the image. Moreover, the SVM-based face detection scheme is not suitable for an apparatus having a low-capacity memory because 1024× 100 support vectors must have been stored in a storage database (DB).

SUMMARY OF THE INVENTION

Accordingly, the present invention has been made to solve the above-mentioned problems occurring in the prior art, and an object of the present invention is to provide an apparatus and method for detecting a face which can reduce the required processing period while efficiently expressing facial features.

To accomplish this object, in accordance with one aspect of the present invention, there is provided a face detection apparatus including an edge detection unit for obtaining horizontal and vertical edges from an input face candidate image; a mosaic generation unit for generating low-dimension mosaic images from high-dimension horizontal and vertical edge images, and extracting a vector value from the low-dimension mosaic image; and a face detection unit for detecting a face by comparing the extracted vector value with a face detection reference value.

In accordance with another aspect of the present invention, there is provided a face detection method including obtaining horizontal and vertical edges from an input face candidate image; generating low-dimension mosaic images from high-dimension horizontal and vertical edge images, and extracting a vector value from the low-dimension mosaic image; and detecting a face by comparing the extracted vector value with a face detection reference value.

BRIEF DESCRIPTION OF THE DRAWINGS

The above and other objects, features and advantages of the present invention will be more apparent from the following detailed description taken in conjunction with the accompanying drawings, in which:

FIGS. 4A and 4B are images illustrating examples of face images and non-face images, respectively;

FIGS. 5A and 5B are images illustrating an input face image and a face image obtained by applying histogram equalization to the input face image, respectively;

FIGS. 6A and 6B are images illustrating horizontal/vertical edge images and normalized images thereof;

FIGS. 7A and 7B are images illustrating mosaic images of horizontal/vertical edge images;

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

In order to detect the face, the present invention uses color components, and enables a Support Vector Machine (SVM) having superior recognition performance to previously learn face images and non-face images and then determine if an image is a face image or a non-face image based on a learned database. The present invention converts a face image into a mosaic image having a minimum size to reduce the dimension of the feature vector, thereby rapidly and correctly detecting a face. By reducing the size of the feature vector as compared with conventional feature vectors, processing speed can be increased, system resources can be conserved, cost can be minimized and battery life can be extended.

In brief, the present invention includes a configuration for generating a face detection reference value and a configuration for detecting a face by using the generated face detection reference value.

Generating a face detection reference value includes randomly collecting a face database, learning the randomly-collected face database by using the SVM, and extracting a support vector extracted through the leaning procedure. The face detection reference value is generated from the extracted support vector.

The present invention detects a face by matching a support vector extracted from a newly-input face candidate image with the generated face detection reference value.

As a result, the present invention can efficiently reduce the dimension of a vector of an input image with the local information of a face conserved, and uses the reduced dimension as a learned data of the SVM, so that it is possible to rapidly detect a face.

That is, the present invention can decrease learning time by efficiently reducing the dimension of a learning image, and also can minimize the time required for face verification and required storage size by reducing the dimension of a support vector.

Hereinafter, a face detection system according to the present invention will be described.

Figure 1:
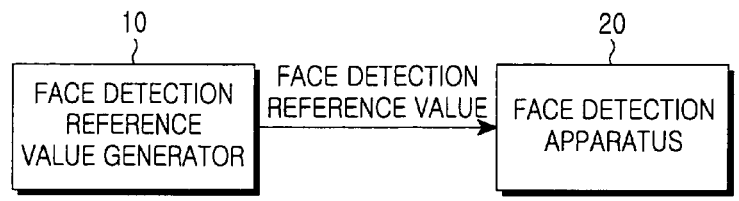
FIG. 1 is a block diagram illustrating the configuration of a face detection system according to an embodiment of the present invention.

FIG. 1 is a block diagram illustrating the configuration of a face detection system according to an embodiment of the present invention. The face detection system includes a face detection reference value generator 10 and a face detection apparatus 20. The face detection reference value generator 10 provides a reference value for face detection to the face detection apparatus 20.

In detail, the face detection reference value generator 10 receives a plurality of face images and non-face images from a face database. Then, the face detection reference value generator 10 generates face detection reference values using the received face images and non-face images. The face detection reference value determines if an image is a face image. The face detection reference values are provided to the face detection apparatus 20. The face detection apparatus 20 stores the face detection reference values provided from the face detection reference value generator 10, and uses the stored face detection reference values when determining if an image is a face image.

Figure 2:
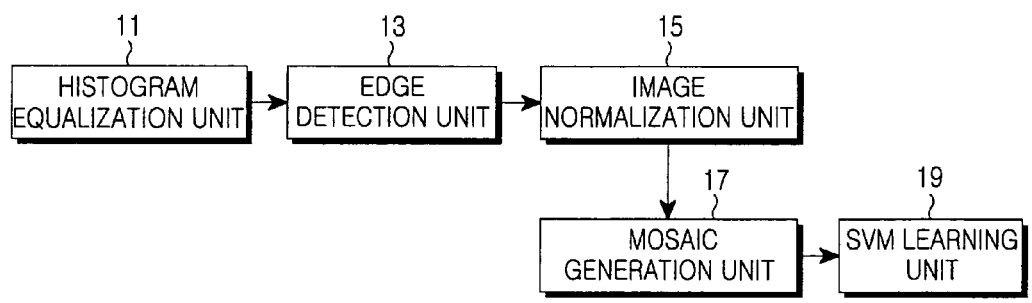
FIG. 2 is a block diagram illustrating the configuration of the face detection reference value generator according to an embodiment of the present invention.
Figure 3:
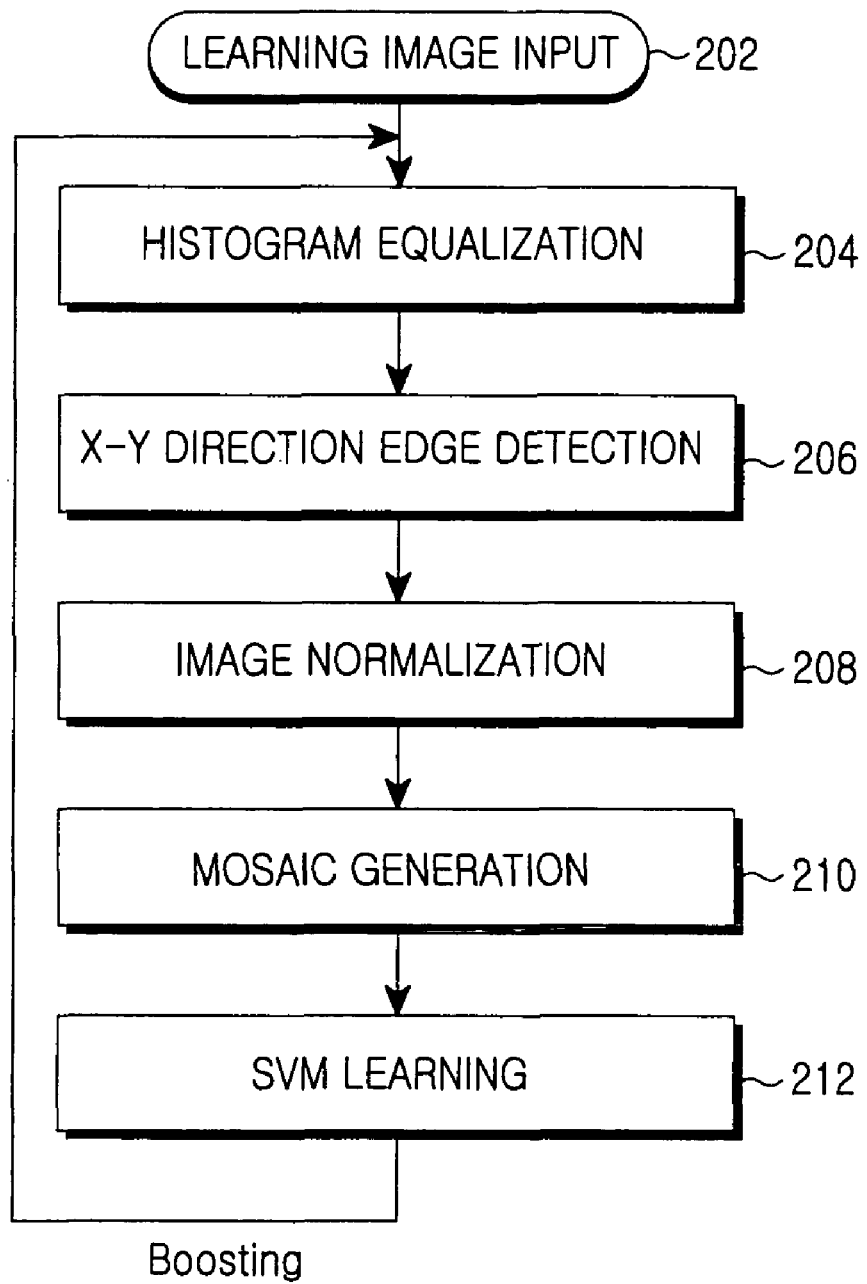
FIG. 3 is a flowchart illustrating a method for generating a face detection reference value according to an embodiment of the present invention.

FIG. 2 is a block diagram illustrating the configuration of the face detection reference value generator 10 according to an embodiment of the present invention, and FIG. 3 is a flowchart illustrating a method for generating a face detection reference value according to an embodiment of the present invention.

Referring to FIG. 2, the face detection reference value generator 10 includes a histogram equalization unit 11, an edge detection unit 13, an image normalization unit 15, a mosaic generation unit 17 and an SVM learning unit 19. The face detection reference value generator 10 operates according to a control flow shown in FIG. 3.

Referring to FIGS. 2 and 3, the face detection reference value generator 10 receives a plurality of face and non-face images from a face database in step 202. For example, N (where N is an integer) learning images are defined to include N/2 face images and N/2 non-face images, and are randomly extracted from a database to be input to the face detection reference value generator 10. In this case, learning images are generated and collected by artificially cropping regions recognized as face candidates from among the entire image. On the basis of human judgment, regions included in an actual face are classified as a face group, and the other regions are classified as a non-face group. The face group includes not only a frontal face but also faces rotated in the right, left, top and bottom directions so that the collected learning images may be less susceptible to change in a face.

Examples of face and non-face images input according to the above-mentioned manner are shown in FIGS. 4A and 4B, respectively. As shown in FIG. 4A, the input face images include various images of a face according to the positions and angles of the faces, changes in facial expression, and changes in lighting (e.g. contrast). This is because human faces may be photographed under various conditions and so various human faces must be extracted from photographed images. In contrast to the face images, the non-face images preferably include environmental images to be photographed together with a human face and images of a human body exclusive of a human face, as shown in FIG. 4B.

Such face and non-face images are input to the histogram equalization unit 11 of the face detection reference value generator 10. The histogram equalization unit 11 performs a histogram equalization operation with respect to the input images in step 204. The face detection reference value generator 10 applies the histogram equalization to the input images to equalize the illuminations of them, because the input images may have been photographed under various lighting conditions. FIG. 5A shows a face image input to the histogram equalization unit 11, and FIG. 5B shows a face image to which the histogram equalization is applied. The histogram equalization unit 11 outputs the image, which has been subjected to the histogram equalization, to the edge detection unit 13.

The edge detection unit 13 performs a Sobel edge detection operation with respect to the histogram-equalized image in step 206. In this case, the edge detection unit 13 changes a Sobel edge operator to a form as shown in Table 1 to detect an X-direction edge, and changes the Sobel edge operator to a form as shown in Table 2 to detect a Y-direction edge.

TABLE 1

| 1  | 2  | 1  |
|----|----|----|
| 0  | 0  | 0  |
| −1 | −2 | −1 |

TABLE 2

| −1 | 0 | 1 |
|----|---|---|
| −2 | 0 | 2 |
| −1 | 0 | 1 |

Since a human face basically has strong high-frequency components in the horizontal and vertical directions, such a face characteristic can be correctly sensed through a Sobel edge detector. Edge-detected face images as described above are shown in each left image of FIGS. 6A and 6B. The edge detection unit 13 transfers edge-detected face images to the image normalization unit 15.

The image normalization unit 15 normalizes input learning images having various sizes to images having a predetermined size (e.g., 30×30 in step 208. Image Normalization is performed for acquiring a normalized edge image in order to generate a correct face detection reference value, because input face images having various sizes may be input. Right images in FIGS. 6A and 6B show normalized images corresponding to their respective edge-detected images shown on the left side of FIGS. 6A and 6B, respectively. The image normalization unit then 15 transfers the normalized images to the mosaic generation unit 17.

The mosaic generation unit 17 generates mosaic images using two detected edge images in step 210. The mosaic images are generated by average values of adjacent pixels. In this case, the dimension of an input image is determined according to the number of adjacent pixels used to obtain an average value.

According to a test result of the present invention, it is determined that the mosaic image having a size of 3×3 is most efficient in view of time as a function of performance. In order to obtain the mosaic images, the edge images other than the original image are utilized. This is because an edge image is less susceptible to illumination changes and can correctly express the facial characteristics. When an input horizontal edge image has a size of 30×30, an average of edge values for a size of 10×10 is calculated and applied to the entire region of the 10×10. When the same manner is applied to the remaining pixels, the edge image of size 30×30 is converted into a mosaic image of size 3×3. That is, a high-dimension edge image is converted into a low-dimension mosaic image.

FIGS. 7A and 7B are illustrations showing mosaic images obtained by using the above-mentioned methods. As shown in FIGS. 7A and 7B, a mosaic portion corresponding to a region expressing a strong edge component is displayed as a brighter color as compared with a portion corresponding to a region expressing a relatively weaker edge component. This means that a mosaic image intactly includes the local characteristic of a face region. Since one mosaic piece in a mosaic image generated by such a manner refers to one dimension of an input vector, an input vector of 900 (30×30) dimensions can be minimized to an input vector of 9 dimensions. Similarly, when such a procedure is applied to an input vertical edge image, a 9-dimension input vector is generated. When the two 9-dimension input vectors are combined into one vector, an 18-dimension input vector is generated for one input image. The dimension of a mosaic image can change depending on the performance of the system. For instance, when system resources are enough, the size of a mosaic can increase to a size of 4×4, or more, which can further improve the detection performance.

According to of the present invention, in addition to the advantage of reducing the dimension of an input image, the characteristics of the input image are intactly conserved, so that it is possible to include all the local characteristics in the learning of the SVM. This contrasts with conventional main-component analysis where a covariance is generated from an average image and an eigenvector is generated by using the covariance, so that it is impossible to extract local characteristics expressing various changes of a face.

While the above description has been made based on a face image, the face detection reference value generator performs the same operation with respect to a non-face image and provides the resultant to the SVM learning unit 19.

An embodiment of the present invention uses an SVM in order to generate a face detection reference value. The SVM will now be described in brief.

The SVM creates a hyperplane that separates data into two classes, in which data most near to an optimum hyperplane is called a "support vector". The SVM algorithm is a scheme to create the optimum hyperplane by using such a support vector. When it is impossible to linearly separate input data, the SVM algorithm can obtain the optimum hyperplane by using a kernel function. As described above, when separating data into two classes in an n-dimensional space, the SVM performs learning while finding an optimum hyperplane of "n−1" dimensions, which maximizes the distance between the two classes and permits data belonging to the same class to be located in the same location, by using several vectors having the most representative characteristics.

When feature vector values extracted from the mosaic image generated by the mosaic generation unit 17 are provided to the SVM learning unit 19, the SVM learning unit 19 sets an output as "1" for each input face image and set an output as "−1" for each input non-face image, and then enables the SVM to learn them (step 212). It is evident that the more input data there is, the more accurate the face detection reference value becomes.

In detail, the SVM learning unit 19 performs SVM learning of the extracted feature vector values, and extracts N support vectors capable of optimally representing a characteristic of each class by using resultant values of the learning. The N support vectors are used as face detection reference values. To be specific, the SVM learning unit 19 can use a Radial basis Function (RBF), a polynomial, a perceptron, etc. as an SVM mapping function used for linear separation after the learning is finished. A feature vector value of a face-region candidate group is input to an SVM mapping function used for linear separation, and the resultant value is compared with a pre-calculated support vector value, thereby determining whether its pattern belongs to a face region or a non-face region. The distance from a hyperplane to the face region and non-face region determined by a support vector is used to measure how near a region is to the face region group, that is, how far a region is from the non-face region group. That is, a region is classified as a face region as the measured distance thereof has a greater positive (+) value and a region is classified as a non-face region as the measured distance thereof has a greater negative (−) value, thereby forming a linear pattern.

Meanwhile, the present invention checks a test result of the SVM, and determines if a face recognition rate meets with a set condition (i.e., condition that a face recognition rate exceeds zero). When the test result does not meet with the set condition, a misrecognized image of tested images is again added to an image database for learning, and then performs a boosting algorithm to repeat learning, thereby reducing a misrecognition rate.

Figure 8:
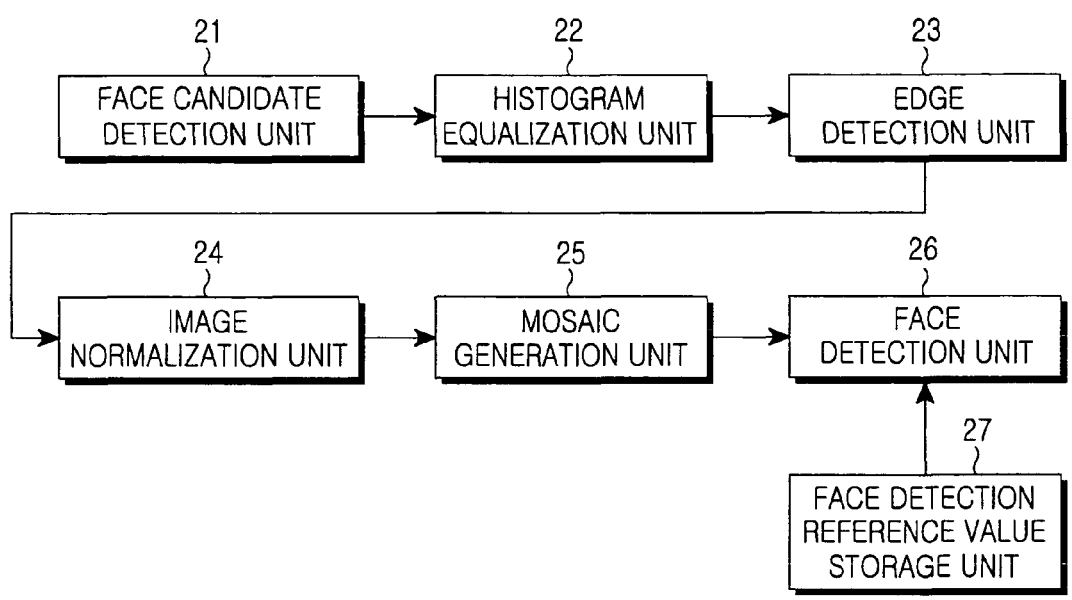
FIG. 8 is a block diagram illustrating the configuration of a face detection apparatus according to an embodiment of the present invention.
Figure 9:
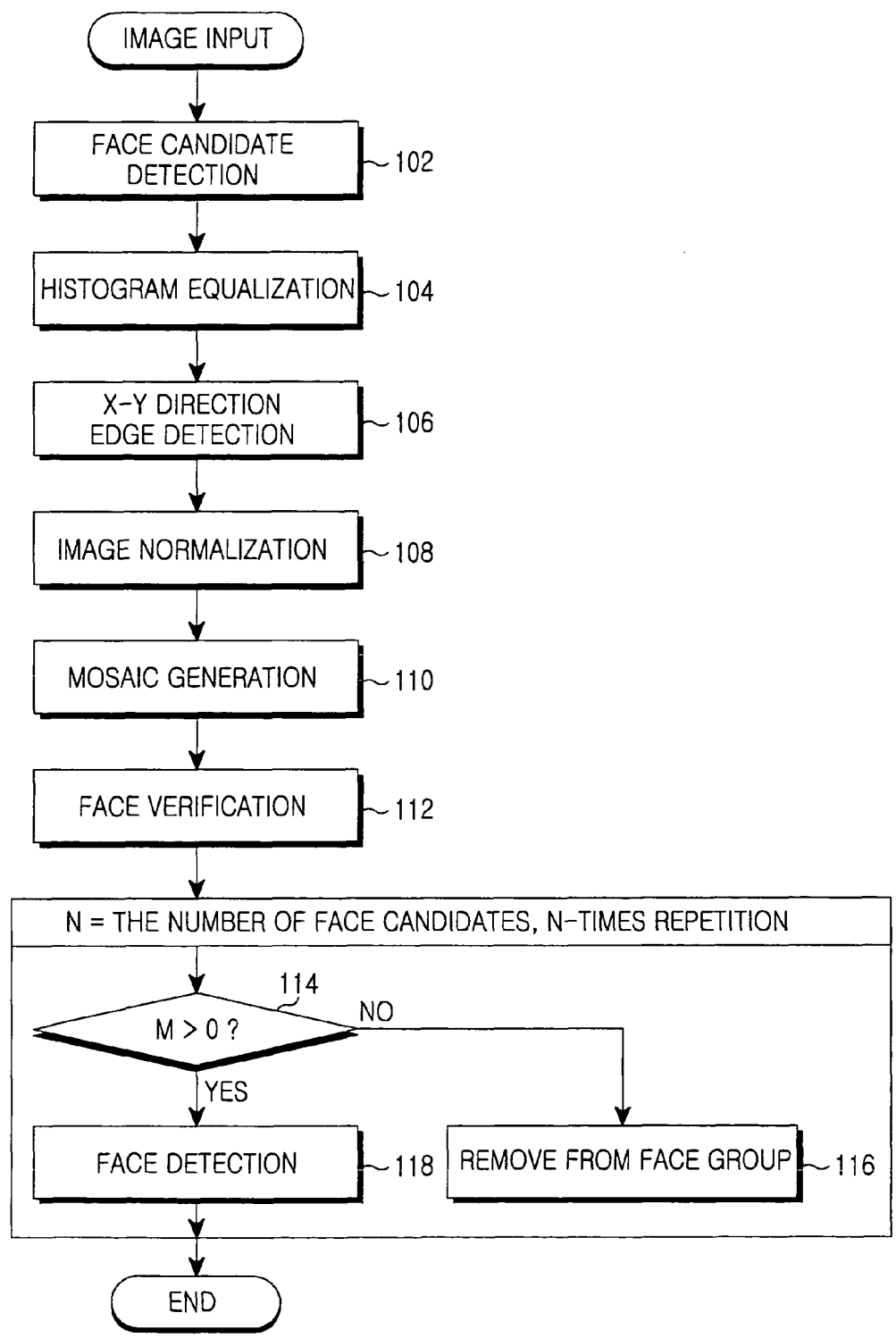
FIG. 9 is a flowchart illustrating a method for detecting a face according to an embodiment of the present invention.

FIG. 8 is a block diagram illustrating the configuration of a face detection apparatus according to an embodiment of the present invention, and FIG. 9 is a flowchart illustrating a method for detecting a face according to an embodiment of the present invention.

The face detection apparatus 20 includes a face candidate detection unit 21, a histogram equalization unit 22, an edge detection unit 23, an image normalization unit 24, a mosaic generation unit 25, a face detection unit 26, and a face detection reference value storage unit 27. Herein, the operations of the histogram equalization unit 22, edge detection unit 23, image normalization unit 24, and mosaic generation unit 25 are similar to those of the histogram equalization unit 11, edge detection unit 13, image normalization unit 15 and mosaic generation unit 17 shown in FIG. 2, so a description thereof will be made with reference to the description of FIG. 2.

Figures 10A, 10B:
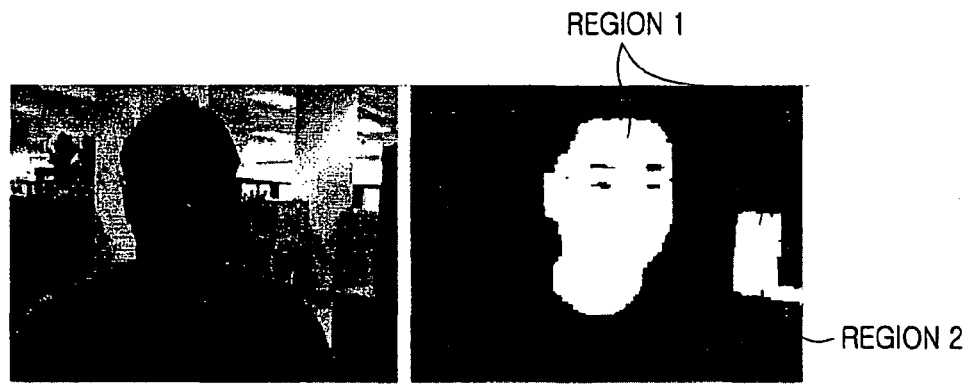
FIGS. 10A and 10B are images illustrating an input image and a face candidate region thereof, respectively.

First, the face candidate detection unit 21 detects face candidates from an input image in step 102. Referring to FIG. 10, the face candidate detection unit 21 extracts face candidate regions, i.e., a first region and a second region, from an input image. In order to detect face candidate regions from an input image, the present invention preferably uses the color information, which can be easily calculated and is unsusceptible to change in the face size and face pose. In this case, the face candidate detection unit 21 changes an RGB color space to an space and uses only Cb and Cr spaces. Typically, when a face is detected by color, "YCbCr" is more widely used than "RGB". This is because, in the case of "RBG", a brightness component is not separated but combined from/with color itself and thus it is difficult to detect a face in a dark area. In contrast, in the case of "YCbCr", since a Y value of brightness can be separated, it is possible to detect a face candidate unsusceptible to change in brightness when "Cb" and "Cr" including only color components are used. In addition, the face candidate detection unit 21 sets a skin-color threshold value so as to be less susceptible to change in illumination, applies morphological opening to skin-color regions detected using the threshold value to remove a noise, and then performs region labeling with respect to the resultant regions. Each region labeled as described above is a face candidate region required to be verified, and is input to the histogram equalization unit 22.

In step 104, the histogram equalization unit 22 performs histogram equalization with respect to an input image and outputs a histogram-equalized image to the edge detection unit 23. In step 106, the edge detection unit 23 detects an X-direction edge and a Y-direction edge of the histogram-equalized image and outputs the resultant to the image normalization unit 24. In step 108, the image normalization unit 24 normalizes the sizes of the input images having various sizes to a predetermined size (e.g., a size of 30×30 and transfers the normalized image to the mosaic generation unit 25.

In step 110, the mosaic generation unit 25 generates mosaic images of the two detected edge images (i.e., the x-direction and Y-direction edge images).

As described above, the mosaic image is generated by average values of adjacent pixels. In this case, the dimension of an input image is determined according to the number of adjacent pixels used to obtain an average value. In order to obtain the mosaic images, the edge images are utilized instead of the original image. However, according to another embodiment of the present invention, the original image can be used instead of the edge images in order to obtain the mosaic images.

The mosaic generation unit 25 converts horizontal and vertical mosaic images into one-dimension vectors and provides the values of the converted vectors to the face detection unit 26. In step 112, the face detection unit 26 compares the vector value of each mosaic image with a face detection reference value which has been previously stored in the face detection reference value storage unit 27. As described above, the face detection reference value is generated by the face detection reference value generator 10, and stored in the memory of the face detection apparatus 20. Then, the face detection reference value generator 10 uses the stored face detection reference value when detecting a face from an image.

When face detection results in a positive value exceeding zero on the basis of the hyperplane of the SVM in step 114, the face detection unit 26 determines that a corresponding image is a face image and performs step 118 to determine a face. In contrast, when face detection results in a negative value equal to or less than zero on the basis of the hyperplane of the SVM, the face detection unit 26 determines that a corresponding image is a non-face image and performs step 116 to exclude the corresponding image from the face group. According to another embodiment of the present invention, the face detection unit 26 may set threshold value exceeding zero and then determine whether an input image using the threshold value. The face detection unit 26 repeats the face detection steps for every face candidate region.

Figure 11:
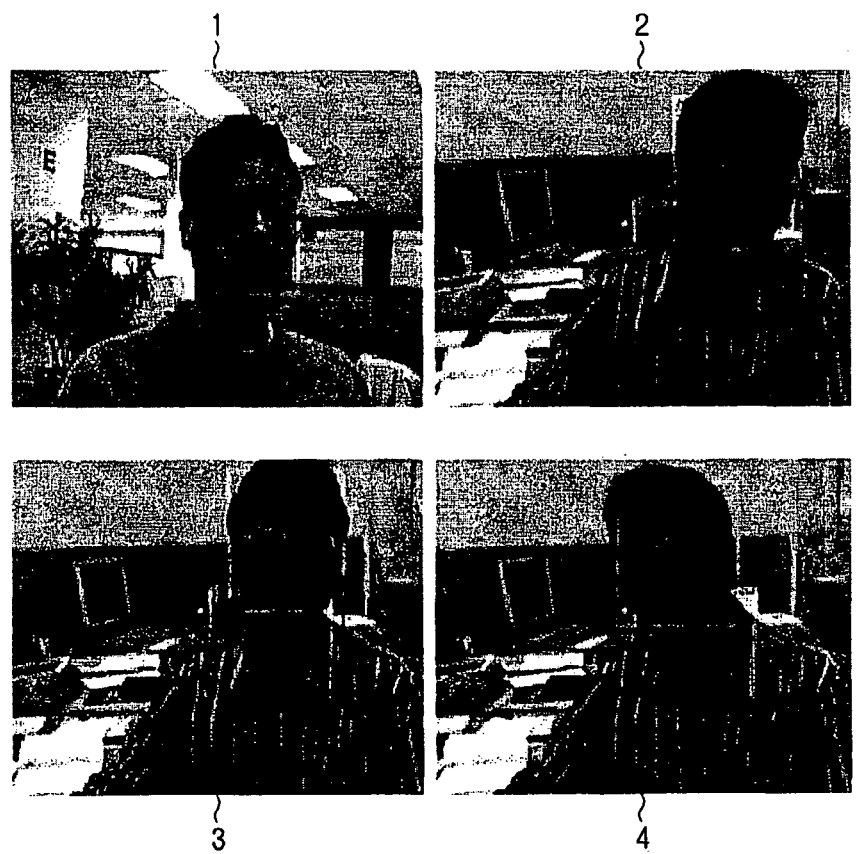
FIG. 11 are images illustrating face images detected according to the present invention.

As described above, in order to detect the face, the present invention not only uses color components, but also enables a Support Vector Machine (SVM) having superior recognition performance to previously learn face images and non-face images and then determines if an image is a face image or a non-face image based on a learned database. Particularly, the present invention reduces the dimension of a feature vector by converting a face image into a mosaic image having a minimum size, thereby rapidly and correctly detecting a face. FIG. 11 shows examples of face images detected according to the present invention. As shown in FIG. 11, according to the present invention, it is possible to detect only a face region from images 1, 2, 3 and 4.

As described above, the face detection method according to the present invention can minimize processing time and required database storage space by efficiently reducing the dimension of face data. Accordingly, the present invention can be easily applied to mobile terminals, embedded robots etc., which have limited processor and storage capacity. In addition, the face detection method of the present invention uses a learning scheme, thereby having a superior detection performance to the other methods based on color, face feature or template.

While the present invention has been shown and described with reference to certain preferred embodiments thereof, it will be understood by those skilled in the art that various changes in form and detail may be made therein without departing from the spirit and scope of the invention as defined by the appended claims. Accordingly, the scope of the invention is not to be limited by the above embodiments but by the claims and the equivalents thereof.

What is claimed is:

1. A face detection apparatus comprising:
    an edge detection unit for obtaining horizontal and vertical edges from an input face candidate image;
    a mosaic generation unit for generating low-dimension mosaic images from high-dimension horizontal and vertical edge images, and extracting a vector value from the low-dimension mosaic images; and a face detection unit for detecting a face by comparing the extracted vector value with a face detection reference value.

2. The apparatus as claimed in claim 1, further comprising a face candidate detection unit for detecting a face candidate region from an input image; and outputting the detected face candidate region as a face candidate image.

3. The apparatus as claimed in claim 2, further comprising a histogram equalization unit for performing histogram equalization with respect to the face candidate image and forming a corresponding histogram-equalized image; and for transferring the histogram-equalized image to the edge detection unit.

4. The apparatus as claimed in claim 2, wherein the face candidate detection unit converts a Red-Green-Blue (RGB) color space into a YCbCr space and detects a face candidate region by using the Cb and Cr spaces.

5. The apparatus as claimed in claim 2, wherein the face candidate detection unit sets a skin-color threshold value, applies a morphological opening to skin-color regions detected using the threshold value in order to remove a noise component, performs region labeling with respect to the skin-color regions, and transfers the labeled skin-color regions as face candidate regions to a histogram equalization unit.

6. The apparatus as claimed in claim 1, wherein the face detection reference value is generated by detecting edges of multiple learning images, generating a mosaic image of an edge image, enabling a Support Vector Machine (SVM) to learn a feature vector value extracted from the mosaic image, and extracting a support vector capable of optimally representing a feature of a face by using a learned resultant value.

7. The apparatus as claimed in claim 1, wherein the edge detection unit employs a Sobel edge detection scheme.

8. The apparatus as claimed in claim 1, further comprising an image normalization unit for normalizing images of various sizes input from the edge detection unit to images having a predetermined size, and transfers the normalized images to the mosaic generation unit.

9. A face detection method performed in a face detection system comprising the steps of:

obtaining, by an edge detection unit, horizontal and vertical edges from an input face candidate image;

generating, by a mosaic generation unit, low-dimension mosaic images from high-dimension horizontal and vertical edge images, and extracting a vector value from the low-dimension mosaic images; and detecting, by a face detection unit, a face by comparing the extracted vector value with a face detection reference value received from a face detection reference value storage unit.

10. The method as claimed in claim 9, further comprising detecting a face candidate region from an input image and outputting the detected face candidate region as a face candidate image.

11. The method as claimed in claim 10, further comprising performing histogram equalization with respect to the face candidate image.

12. The method as claimed in claim 10, wherein outputting the face candidate image includes converting a Red-Green-Blue (RGB) color space of a face candidate region into a YCbCr space and detecting the face candidate region by using the Cb and Cr spaces.

13. The method as claimed in claim 10, wherein outputting the face candidate image includes:

setting a skin-color threshold value, and applying a morphological opening to skin-color regions detected using the threshold value, thereby removing a noise component; and detecting the face candidate region by performing region labeling with respect to the noise-removed regions.

14. The method as claimed in claim 9, wherein the face detection reference value is generated by:

detecting edges of multiple learning images and generating a mosaic image of an edge image corresponding to at least one of the multiple learning images;

extracting a feature vector value from the mosaic image; and enabling a Support Vector Machine (SVM) to learn the feature vector value, and extracting a support vector capable of optimally representing a feature of a face by using a learned resultant value.

15. The method as claimed in claim 9, wherein obtaining horizontal and vertical edges is performed using a Sobel edge detection scheme.

16. The method as claimed in claim 9, further comprising normalizing input edge images of various sizes to images having a predetermined size, before generating the mosaic images.

\* \* \* \* \*